United States Patent
Menaldo et al.

(10) Patent No.: US 7,908,941 B2
(45) Date of Patent: Mar. 22, 2011

(54) HEATED AND COOLED STEERING WHEEL

(75) Inventors: Lorenzo Menaldo, Villafranca (IT); Giuseppe Testa, Illasi (IT); Alberto Muscio, Modena (IT); Stefano Soragni, Martino in Rio (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 1917 days.

(21) Appl. No.: 10/866,811

(22) Filed: Jun. 15, 2004

(65) Prior Publication Data
US 2004/0261567 A1    Dec. 30, 2004

(30) Foreign Application Priority Data
Jun. 24, 2003  (EP) .................................... 03425408

(51) Int. Cl.
*G05G 1/04* (2006.01)
*B60L 1/02* (2006.01)
*H05B 1/02* (2006.01)
*H05B 3/58* (2006.01)
(52) U.S. Cl. ........... 74/552; 219/204; 219/497; 219/535
(58) Field of Classification Search .................. 74/552; 219/497, 204, 535; 62/244; *B60H 2/00; B62D 1/06*
See application file for complete search history.

(56) References Cited

U.S. PATENT DOCUMENTS

| 4,640,340 A | 2/1987 | Noda et al. |
| 5,850,741 A | 12/1998 | Feher |
| 6,481,312 B1 | 11/2002 | Wissel |
| 6,509,552 B1 * | 1/2003 | Roske et al. .................. 219/497 |
| 2004/0139758 A1* | 7/2004 | Kamiya et al. .................. 62/244 |
| 2004/0168540 A1* | 9/2004 | Weiss .............................. 74/552 |
| 2007/0228028 A1* | 10/2007 | Starck et al. .................. 219/204 |

FOREIGN PATENT DOCUMENTS

| DE | 199 51 224 A | 5/2001 |
| FR | 2682071 A | 4/1993 |
| JP | 10230857 A | 9/1998 |
| JP | 2006-176037 * | 7/2006 |
| WO | WO 02/053400 A2 * | 7/2002 |
| WO | WO 03 047942 A | 6/2003 |

OTHER PUBLICATIONS

"Heating and cooling with a heat pump", published by Canada's Office of Energy Efficiency, Dec. 2004, http://en.wikipedia.org/wiki/Heat_pump, see the illustration on p. 13.

* cited by examiner

*Primary Examiner* — Vinh T. Luong
(74) *Attorney, Agent, or Firm* — Lonnie R. Drayer

(57) ABSTRACT

A steering wheel has a ring portion, spoke portions and a hub portion. The steering wheel is provided with a thermoelectric reversible heat pump to heat or cool a fluid. A closed hydraulic circuit includes a hydraulic pump and at least one duct extending along the ring portion of the steering wheel. The fluid is heated or cooled by the thermoelectric heat pump and is circulated by the hydraulic pump within the ring portion of the steering wheel to heat or cool the ring portion.

11 Claims, 2 Drawing Sheets

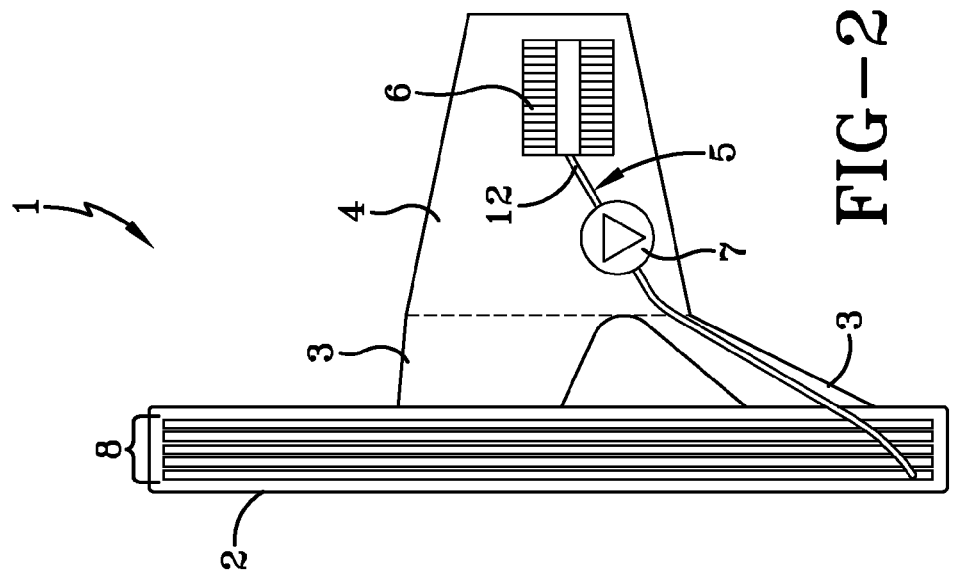
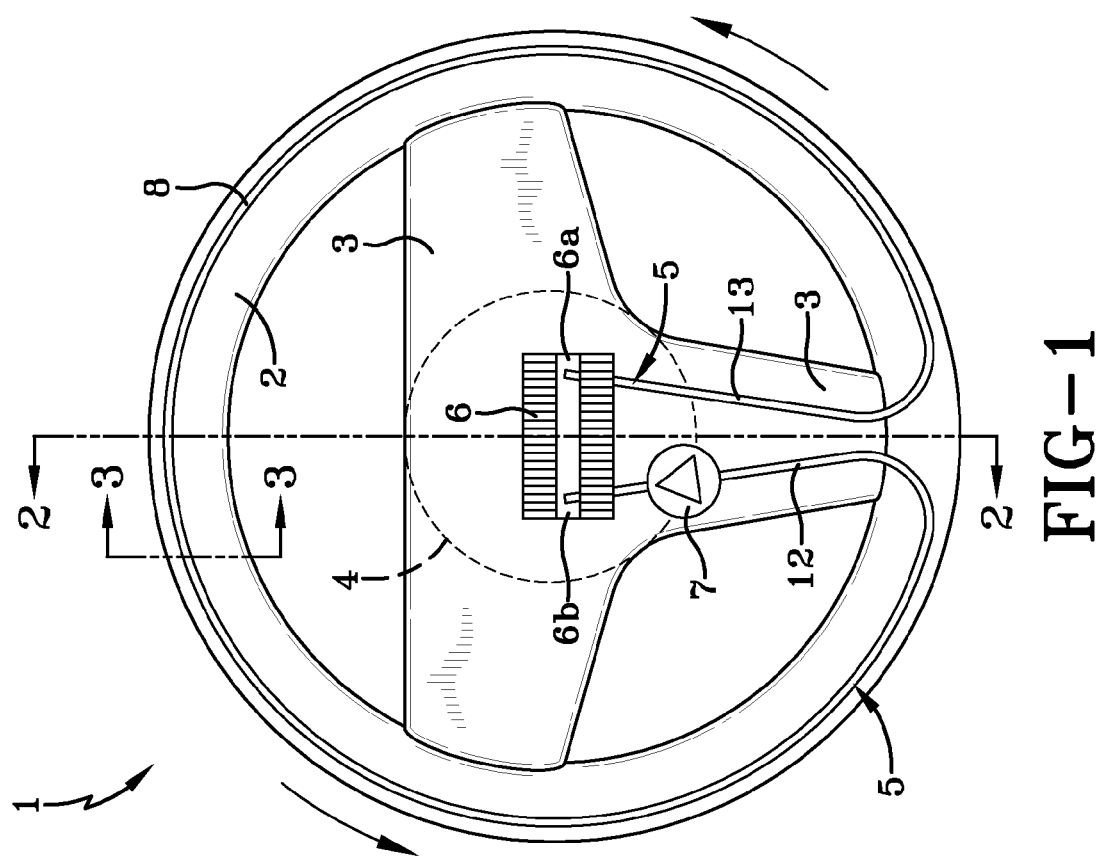

HEATED AND COOLED STEERING WHEEL

FIELD OF THE INVENTION

The present invention relates to a heated and cooled steering wheel for motor vehicles.

BACKGROUND OF THE INVENTION

When a motor vehicle is parked in direct sunlight during the summer, or in a hot climate, the temperature of the passenger compartment becomes quite hot so that the temperature of the steering wheel may be uncomfortable to touch. Likewise in the winter, or in a cold climate, the steering wheel can become so cold that it is uncomfortable to touch. Even if the vehicle is provided with a powerful heating and cooling system the steering wheel can take a considerable time to reach a temperature that is comfortable to touch.

DISCUSSION OF THE PRIOR ART

Various ways to sole the problem of a quick steering wheel temperature control have been suggested.

U.S. Pat. No. 4,640,340 A discloses a steering wheel wherein the heating/cooling effect of thermoelectric transducers, which utilize the Peltier effect, are used to control the temperature of the gripping portion of the steering wheel. A heat pipe is positioned in a circular ring portion of the steering wheel, welded to the hub portion of the steering wheel, and is connected in a heat conducting manner to the thermoelectric transducers in the gripping portion and to an aluminum plate located under the skin layer of the steering wheel. Heat absorbed by the plate can be conducted to a radiating portion through the heat pipe and radiated. Conversely, when the plate is heated, heat can be absorbed from the radiation portion and transmitted to the plate through the heat pipe.

FR 2682071 A1 discloses a heated/cooled steering wheel wherein variations in the temperature of the ring portion of the steering wheel are achieved using the Peltier effect from a current flowing through an electric wire spirally wound on the core of the ring portion.

Another example of a steering wheel fitted with an apparatus based on the Peltier effect is disclosed in U.S. Pat. No. 5,850,741 A. This steering wheel is provided with a heat pump housed in the hub portion and heat pipes and heat exchangers housed in the gripping portion of the steering wheel rim. The heat pump is preferably of the thermoelectric variety (e.g. a Peltier device) and may be coupled to an auxiliary heat exchanger such as a fan.

Other solutions that are not based on the Peltier effect have been provided to control the temperature of a steering wheel. For example, U.S. Pat. No. 6,481,312 B1 discloses a ventilated steering wheel wherein the ring portion is provided with an internal air duct. A plurality of circumferentially spaced passages connect the duct with the external surface of the ring portion. A fan housed in an intermediate portion of the steering wheel, between the ring and the spokes, provides a flow of air into the duct to provide heating/cooling of the ring portion of the steering wheel.

Prior art steering wheel with temperature controls have several drawbacks, thus they are not widely produced. The steering wheels disclosed in U.S. Pat. No. 4,640,340 A and U.S. Pat. No. 5,850,741 A have only the handgrip portion of the ring affected by the heating/cooling mechanism. Furthermore heat pipes can only be employed in some restricted portions of the steering wheel. In fact their operation is based on the "capillary effect" and this effect cannot be achieved for a long length of the pipe. Moreover, heat pipes dissipate heat with an exponential law along their length, this causing the last third of a pipe not to be as efficient as the remainder of the pipe.

In prior art steering wheels that use a Peltier device heat flows are achieved through a difference in temperatures between different regions of the steering wheel, namely a first region called a "warm side" and a second region called a "cool side", caused by a difference in the voltage of these regions. The cool side remains cool until the warm side provides a steady flow of heat. If the temperature of the warm side matches the temperature of the cool side the Peltier device saturates and may burn causing a failure of the heating/cooling system.

The fan present in the steering wheel disclosed in U.S. Pat. No. 6,481,312 B1 causes the steering wheel to be noisy. Furthermore, fluid dynamic losses cause the hole in the ring portion not to be supplied with the same amount of air causing the temperature of the ring portion not to be uniform.

There remains a need for a heated and cooled steering wheel wherein the temperature of the entire ring portion is controlled within a wide range.

SUMMARY OF THE INVENTION

The present invention solves the above-identified problems by providing a steering wheel with an apparatus for heating or cooling its circular ring, which is quiet, compact and reliable, that can be housed in a steering wheel together with an airbag module and other known devices, and wherein the ring temperature is changes with high efficiency in a short time. A steering wheel according to the present invention has a ring portion, at least one spoke portion, a hub portion and a reversible heat pump. It also has a closed hydraulic circuit including a hydraulic pump to circulate a fluid in the circuit and at least one duct extending along at least part of the ring portion.

BRIEF DESCRIPTION OF THE DRAWINGS

FIG. 1 is a schematic front view of a steering wheel according to the invention.

FIG. 2 is a schematic side cross-section view of the steering wheel of FIG. 1, taken at line 2-2 of FIG. 1.

DETAILED DESCRIPTION OF THE INVENTION

Figure 3:
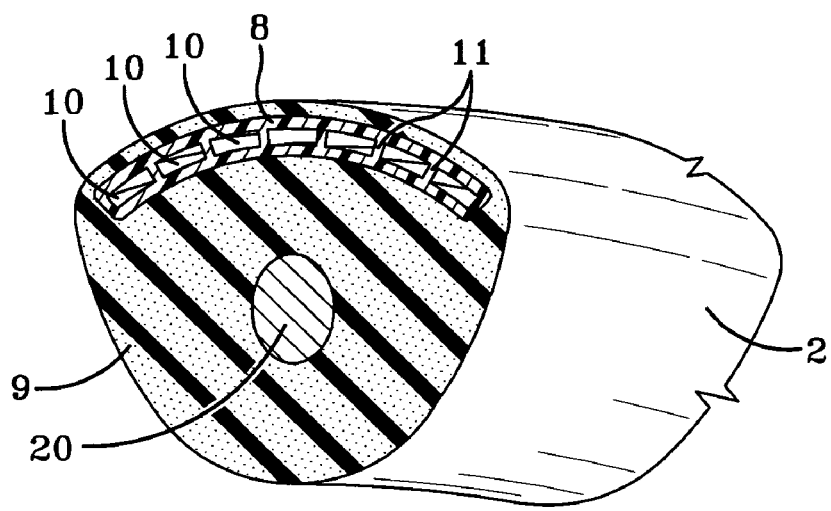
FIG. 3 is a perspective cross-section view of the ring portion of the steering wheel, taken at line 3-3 of FIG. 1.

With reference to FIGS. 1-5, a steering wheel 1 according to the present invention has a circular ring portion 2 and spoke portions 3 integrally connected thereto and also connected to a hub portion 4. The steering wheel 1 is provided with a hydraulic circuit 5, a reversible heat pump 6 and a hydraulic pump 7 that circulates fluid in the hydraulic circuit 5. A heat exchanger and a hydraulic pump are housed in the hub portion 4.

As used herein and in the claims a "ring portion" is understood to mean the gripping portion of the steering wheel, i.e. that portion that comes into contact with the motor vehicle operator's hands. The "ring portion" is usually a closed circular ring, or toroidal, but it can be "U" shaped to form an open loop. As used herein and in the claims the "spoke portion" of the steering wheel identifies any portion of the steering wheel that connects the ring portion with the central portion of the steering wheel, i.e. the hub. The spoke portion (s) may have any suitable shape and may be present in any suitable number.

The fluid use in the heating/cooling system is preferably a liquid and more preferably the liquid is a mixture of water and glycol. The amount of glycol in the mixture is preferably in the range of about 20% to about 40% by weight, in order to reach a freezing temperature of about −40° C. Other possible fluids are alcohols, pure or in a mixture of water or gases such as freon.

The hydraulic circuit 5 comprises at least one duct 8 housed in the ring portion 2 and extending at least a portion of the circumference of the ring portion, but preferably along the entire circumference of the ring portion. For example, there may be two ducts 8 in opposite parallel flows. In the illustrated embodiment the hydraulic circuit 5 is provided with a single duct 8 that connects an outlet 6a of a heat pump 6 with an inlet 6b after extending substantially the entire circumference of the ring portion.

The duct 8 can be made of many different materials and can be shaped in different ways depending on the shape of the ring portion 2. The duct 8 is preferably made by extrusion of a thermoplastic material and has a curved shape to conform to the shape of the surface 9 of the steering wheel, as shown in FIG. 3, and to be oriented substantially parallel to the surface 9. The duct 8 should have walls that are as thin as possible to better transmit heat, and it is arranged as close as possible to the surface 9 of the ring portion 2. The duct 8 shown in the figures is separated from the external surface 9 of the ring portion 2 by a foam that conducts heat.

Figure 4:
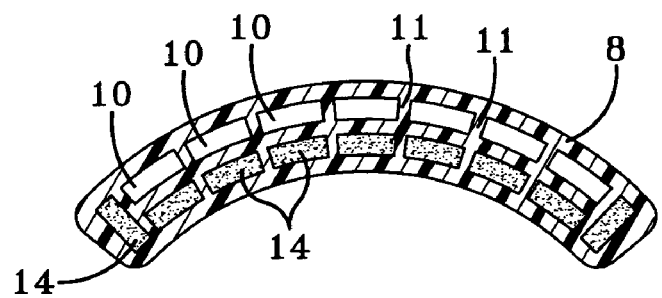
FIG. 4 is a cross-sectional view of an alternative embodiment of a multi-channel duct.

In the preferred embodiment shown in FIGS. 3 and 4 the duct 8 is a multi-channel duct formed by a plurality of parallel channels 10 through which the mixture of water and glycol flows in two adjacent channels that are separated by walls 11. The walls 11 are radially oriented with respect to the core 20 of the ring portion 2 and substantially perpendicular to a surface 9 of the ring portion 2, i.e. to the surface that is gripped by a motor vehicle operator. A good resistance to compression is thus obtained. The parallel channels 10 may have different shapes such as rectangular, lenticular, asymmetric, etc., different layouts within the duct 8, and may be provided with internal turbulators to reach high heat exchange coefficients.

The multi-channel duct 8 shown in FIGS. 3-4 is made by extruding a plastic material into a curved structure wherein each channel 10 has a rectangular cross-section and is substantially parallel to an adjacent channel 10, i.e. two channels 10 share a common wall 11 that is also a rib to improve the resistance to compression of the multi-channel duct 8.

FIG. 4 shows a further embodiment of a multi-channel duct 8 that is provided with a plurality of insulating channels 14 positioned under flow channels 10 and is integral to them to provide thermal insulation from the core 20 (FIG. 3) of the ring portion 2. The insulating channels 14 may contain a fluid having low heat exchange coefficients. In the embodiment shown in FIG. 4 the insulating channels 14 contain air.

The terminal portions of each multi-channel duct 8 in the hydraulic circuit 5 are connected to an internal heat exchanger 15 of the heat pump 6 via junction ducts 12, 13. The junction ducts are lodged in the spoke portions 3, are made of a plastic material and are as short as possible and have tubular shapes with thin walls. The junction ducts 12, 13 are preferably covered with an insulating layer and are spaced from the metal portion of the steering wheel to avoid thermal losses in the spoke portions 3. In particular, the two end portions of the multi-channel duct 8 shown in the drawings are respectively connected to a first junction duct 12 and to a second junction duct 13. Both junction ducts 12, 3 are housed in the lower spoke portion 3 of the steering wheel 1. The junction ducts 12, 13 are themselves connected to an internal heat exchanger 15 of a heat pump 6. The multi-channel duct 8 is coupled to the first junction duct 12 connecting an outlet of the internal heat exchanging device to the multi-channel duct, and the second junction duct 13 connecting to multi-channel duct 8 to an inlet of the internal heat exchanging device. The second junction duct communicates with the hydraulic pump. A plenum can be provided to avoid over pressures of the fluid. The purpose of the hydraulic pump is to circulate the fluid in the hydraulic circuit.

One of the junction ducts in proved with hydraulic pumps and a plenum. In particular, one hydraulic pump is necessary for each multi-channel duct 8 provided in the steering wheel 1 to circulate the fluid inside each duct 8. Suitable hydraulic pumps are, for example, centrifugal pumps, gear pumps, diaphragm pumps, helical rotor pumps, etc. Preferably, hydraulic pumps are provided upstream of the internal heat exchangers in order to have the heat generated by the pump immediately treated by the heat exchanger.

In the embodiment shown in FIGS. 1-2 the first junction duct 12 is provided with a lobular hydraulic pump 7, e.g. of the type used for feeding fuel to the motor vehicle's engine.

Figure 5:
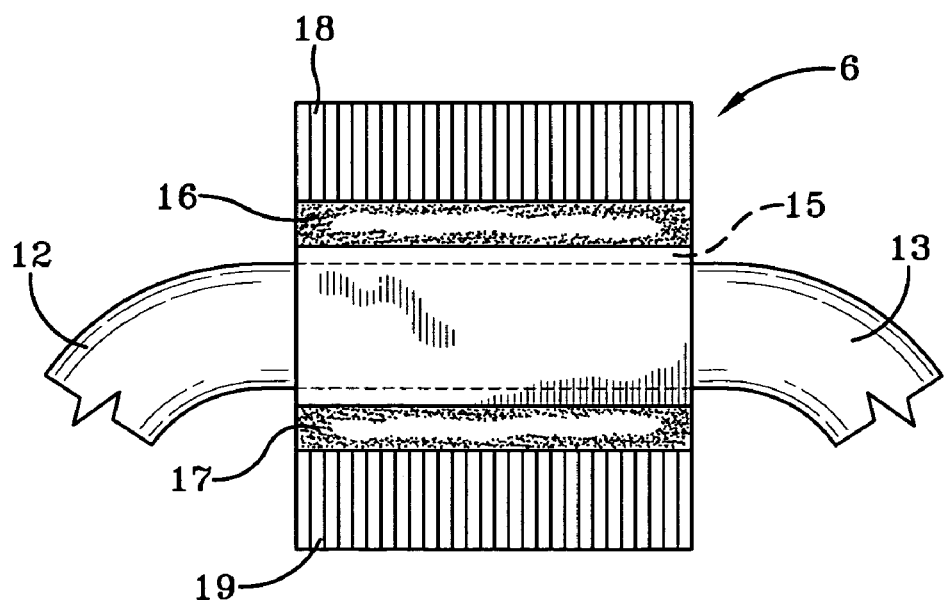
FIG. 5 is a schematic of the heat pump used in the steering wheel of FIG. 1.

The internal heat exchanger of the heat pump is connected to the junction ducts and is connected in a heat conductive manner to the heat pump 6. The internal heat exchanger is generally provided with a plurality of channels wherein the fluid can efficiently exchange heat with the reversible heat pump 6. Preferably, the reversible heat pump is a Peltier device comprising at least two thermoelectric modules spaced and symmetrically arranged to define a heat exchanging are for a heat exchanging device. For example, the internal heat exchanger can be provided with turbulators to improve the heat transfer coefficient between the fluid and the walls of the channels and consequently improve thermal flows with the heat pump 6. The channels may be configured to support cross flows or opposite direction flows. FIG. 5 shows a schematic of the heat pump 6 used in the hydraulic circuit of FIG. 1. The heat pump 6 is coupled to the internal heat exchanger 15.

Depending upon the direction of the electric current in the thermoelectric modules the heat pump absorbs heat from the fluid flowing in the hydraulic circuit or supplies heat to the same fluid. The fluid is circulated in the circuit by the hydraulic pump, and while flowing in the multi-channel duct provides the temperature control of he ring portion of the steering wheel by vectoring the hear from/to the ring portion.

The heat pump 6 preferably comprises a plurality of thermoelectric modules that are connected in a heat conductive manner to the internal heat exchanger 15, preferably without forming heat bridge, for example by screws. According to the preferred embodiment of the invention, as shown in FIG. 5, at least two thermoelectric modules 16, 17 are provided on two different sides of the internal heat exchanger 15 in such a way that the internal heat exchanger is sandwiched between the modules. Thermal grease supplied with dispersed metallic dust in interposed between the modules and the heat exchanger. In the arrangement shown in FIG. 5 the internal heat exchanger 15 is sandwiched between the thermoelectric modules 16, 17 of the of the heat pump 6 in such a way that when the heat pump is operative the electric charge on surfaces of the modules 16, 17 that face the internal heat exchanger 15 have, at a given time, the same charge (positive or negative) on both modules 16, 17.

In general, heat sinks may be externally connected to the thermoelectric modules to provide a further improvement in heat dissipation. The embodiment shown in FIGS. 1-5 is provided with two heat sins 18, 19 connected, in a heat conductive manner, to the thermoelectric modules 16, 17.

To further improve heat exchange, air from the air conditioning system of the vehicle provided with the steering wheel of the present invention is directed to blow on the heat pump 6, and in particular on the heat sinks 16, 17. In this embodiment, the hub portion 4 is provided with appropriate air intakes, channels and exhaust nozzles to supply the appropriate airflow. A fan may be mounted on the steering wheel 1 to provide the appropriate airflow.

There is further provided by the present invention a process for conditioning a liquid in a heat pump by heating or cooling it; circulating the liquid through the duct 8 extending along the ring portion 2 of the steering wheel and feeding the liquid back to the heat pump 6 using the hydraulic pump 7. The fluid circulation velocity is preferably in the range of about one to about three m/s and the fluid flow rate is preferably with the range of about seven to about ten $m^3/h$. The delivery pressure of the hydraulic pump 7 is preferably in the range of about one-half to three bar. The electric motor for the pump is a twelve or twenty-four volt cc motor suitable to be used in a temperature range of about −40° C. to +110° C.

Depending on the direction of the electric current in the thermoelectric modules 16, 17, the heat pump 6 absorbs heat from the fluid flowing in the hydraulic circuit 5 or supplies heat to the same fluid. The fluid is circulated in the circuit 5 by the hydraulic pump 7, and while flowing in the multi-channel duct 8 provides the temperature control of the ring portion 2 by vectoring the heat from/to the ring portion 2. Consequently, by varying the operative parameters of the heat pump 6 and hydraulic pump 7, and possibly the air flow blowing on the heat pump 6, the temperature of the external surface 9 of the ring portion 2 is controlled.

The steering wheel of the present invention has many advantages over the known art. In fact the ring portion of the steering wheel of the present invention can be completely heated and cooled. Because the invention employs a liquid cooling apparatus, it is more efficient that an apparatus according to the know art that utilizes heat pipes and Freon. The higher efficiency of the invention allows compact components to be used, this leading to configurations that permit the steering wheel to occupy the steering wheel in a manner complementary to an airbag module and electronic devices that are also located in the steering wheel. Moreover, faster temperature changes of the ring portion of the steering wheel are achieved by the present invention than by cooled/heated steering wheels of the known art.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A heated and cooled steering wheel comprising a ring portion, at least one spoke portion, a hub portion, a reversible heat pump, and a closed hydraulic circuit including a hydraulic pump to circulate a fluid in said circuit and at least one duct extending along at least part of said ring portion, said duct being a multi-channel duct comprising a plurality of separate parallel channels separated by separation walls and a plurality of insulating channels interposed between said plurality of separate channels and a core portion of said ring portion.

2. A heated and cooled steering wheel according to claim 1 wherein said heat pump comprises at least two thermoelectric modules.

3. A heated and cooled steering wheel according to claim 2 wherein said thermoelectric modules are spaced and symmetrically arranged to define a heat exchanging area for an internal heat exchanging device.

4. A heated and cooled steering wheel according to claim 3 wherein said thermoelectric modules are Peltier devices coupled in a heat conductive manner to said internal heat exchanging device and to an external heat sink.

5. A heated and cooled steering wheel according to claim 2 wherein each of said separate parallel channels has a rectangular cross section.

6. A heated and cooled steering wheel according to claim 3 wherein each of said separate parallel channels has a rectangular cross section.

7. A heated and cooled steering wheel according to claim 4 wherein each of said separate parallel channels has a rectangular cross section.

8. A heated and cooled steering wheel according to claim 3 further comprising a first junction duct connecting an outlet of said heat exchanging device to said multi-channel duct, and a second junction duct connecting said multi-channel duct to an inlet of said heat exchanging device, said second junction duct communicating with said hydraulic pump.

9. A heated and cooled steering wheel according to claim 3 wherein said thermoelectric modules comprise a Peltier device coupled in a heat conducting manner to said internal heat exchanging device and to an external heat sink.

10. A heated and cooled steering wheel according to claim 1 wherein each of said separate parallel channels has a rectangular cross section.

11. A heated and cooled steering wheel according to claim 1 wherein the fluid is a mixture of water and glycol.

* * * * *